(12) United States Patent
Reiman et al.

(10) Patent No.: US 6,799,791 B2
(45) Date of Patent: Oct. 5, 2004

(54) DEPLOYABLE VEHICLE FAIRING STRUCTURE

(75) Inventors: James Reiman, Winnetka, IL (US); Peter Heppel, New York, NY (US)

(73) Assignee: Aerotail, LLC., Winnetka, IL (US)

( * ) Notice: Subject to any disclaimer, the term of this patent is extended or adjusted under 35 U.S.C. 154(b) by 0 days.

(21) Appl. No.: 10/323,700

(22) Filed: Dec. 19, 2002

(65) Prior Publication Data

US 2004/0119319 A1 Jun. 24, 2004

(51) Int. Cl.$^7$ .............................................. B62D 35/00
(52) U.S. Cl. ................................. 296/180.1; 296/180.4
(58) Field of Search ......................... 296/180.1, 180.4, 296/180.5

(56) References Cited

U.S. PATENT DOCUMENTS

| | | |
|---|---|---|
| 2,737,411 A | 3/1956 | Potter |
| 2,982,290 A | 5/1961 | Hunziker ........................ 135/1 |
| 3,206,100 A | 9/1965 | Wenger ......................... 229/44 |
| 3,371,453 A | 3/1968 | Groskopfs et al. ............. 52/108 |
| 3,533,202 A | 10/1970 | Gellert ........................... 52/80 |
| 3,534,514 A | 10/1970 | Gellert ........................... 52/80 |
| 3,657,753 A | 4/1972 | Le Blanc, Sr. ............... 9/310 F |
| 3,721,027 A | 3/1973 | Slavsky ....................... 40/10 R |
| 3,751,615 A | 8/1973 | De Loisy .................. 200/86 R |
| 3,774,309 A | 11/1973 | Leopoldi ...................... 33/138 |
| 4,006,932 A | 2/1977 | McDonald |
| 4,030,779 A | 6/1977 | Johnson |
| 4,036,519 A | 7/1977 | Servais et al. |
| 4,088,362 A | 5/1978 | Mollura |
| 4,142,755 A | 3/1979 | Keedy |
| 4,145,850 A | 3/1979 | Runyon .......................... 52/71 |
| 4,153,288 A | 5/1979 | Mueller |
| 4,257,641 A * | 3/1981 | Keedy ...................... 296/180.4 |
| 4,419,994 A | 12/1983 | Hilton ................... 128/206.19 |
| 4,425,929 A | 1/1984 | Von Mosshaim ........... 135/102 |
| 4,451,074 A | 5/1984 | Scanlon |
| 4,458,936 A | 7/1984 | Mulholland |
| 4,601,508 A | 7/1986 | Kerian |
| 4,688,841 A | 8/1987 | Moore |
| 4,702,509 A | 10/1987 | Elliott, Sr |
| 4,741,569 A | 5/1988 | Sutphen |
| 4,818,015 A | 4/1989 | Scanlon .................... 296/180.1 |
| 4,978,162 A | 12/1990 | Labbe ...................... 296/180.2 |
| 5,058,945 A | 10/1991 | Elliott, Sr. et al. ........ 296/180.5 |
| 5,240,306 A | 8/1993 | Flemming ................ 296/180.4 |
| 5,355,555 A | 10/1994 | Zarelius ......................... 16/225 |
| 5,375,903 A | 12/1994 | Lechner .................... 296/180.1 |
| 5,498,059 A | 3/1996 | Switlik .................... 296/180.1 |

(List continued on next page.)

FOREIGN PATENT DOCUMENTS

DE          3817497        * 12/1988

Primary Examiner—Dennis H. Pedder
(74) Attorney, Agent, or Firm—Fitzpatrick, Cella, Harper & Scinto (57) ABSTRACT

A vehicle fairing structure having a first semi-rigid surface with a first curved edge, the first semi-rigid surface adapted to be rotatably secured to a vehicle to permit the first semi-rigid surface to assume a first position adjacent the vehicle and a second position extended from the vehicle, and a first joint structure spanning the first semi-rigid surface to permit the first semi-rigid surface to be folded when in the first position and unfolded when in the second position. The structure includes a second semi-rigid surface having a second curved edge, the second semi-rigid surface adapted to be rotatably secured to the vehicle to permit the second semi-rigid surface to assume a first position adjacent the vehicle and a second position extended from the vehicle. The first and second semi-rigid surfaces are joined together at their first and second curved edges by a second joint structure adapted to permit the first and second semi-rigid surfaces to fold approximately together when the first and second semi-rigid surfaces are adjacent the vehicle.

3 Claims, 7 Drawing Sheets

U.S. PATENT DOCUMENTS

| | | | |
|---|---|---|---|
| 5,685,597 A | 11/1997 | Reid | 296/180.1 |
| 5,823,610 A | 10/1998 | Ryan et al. | 296/180.4 |
| 5,947,548 A | 9/1999 | Carper et al. | 296/180.1 |
| 6,082,385 A | 7/2000 | Burford et al. | 135/104 |
| 6,092,861 A | 7/2000 | Whelan | 296/180.2 |
| 6,126,239 A | 10/2000 | Hazzard | 297/440.1 |
| 6,309,010 B1 | 10/2001 | Whitten | 296/180.4 |
| 6,343,441 B1 | 2/2002 | Merz et al. | 52/66 |
| 6,428,084 B1 * | 8/2002 | Liss | 296/180.3 |
| 6,467,833 B1 | 10/2002 | Travers | 296/180.4 |
| 6,485,087 B1 * | 11/2002 | Roberge et al. | 296/180.5 |
| 2003/0131539 A1 | 7/2003 | Burford et al. | 52/64 |

* cited by examiner

DEPLOYABLE VEHICLE FAIRING STRUCTURE

BACKGROUND OF THE INVENTION

1. Field of the Invention

This invention relates to structures for improving the aerodynamic shape of vehicles, and more particularly to a deployable structure that is easily opened to improve the aerodynamic shape of a vehicle, and closed when not used. When closed, the structure nests unobtrusively against the vehicle.

2. Description of the Art

The amount of power needed to move a vehicle over land or through the air increases with the speed of the vehicle, due to aerodynamic drag. The amount of power necessary to overcome aerodynamic drag directly translates into increased fuel consumption, and thus cost of operation.

Because of this, attention has been directed at reducing the aerodynamic drag of a wide variety of transport vehicles, such as trucks. The form drag of a truck is related in part to the shape of the frontal parts, such as the cab and the abruptness of its transition to the trailer or container. There have been a variety of improvements made to improving the aerodynamic shape of these parts, such as by making the hood, windscreen, fenders etc. more streamlined in form, as well as by adding fairings to the cab roof, or the front of the truck box.

Another significant contributor to the form drag of a truck is the drag associated with the rear of the trailer. A typical trailer box will terminate with a large rectangular surface. This shape causes an area of reduced pressure to be created behind the trailer box as it moves over the highway, the result of which is to generate a retarding force that must be overcome with additional engine power, and thus additional fuel.

Accordingly, there have been efforts directed at adding a fairing to the rear of the trailer box to lessen the reduced pressure area created at the rear, and thus improve the over the road fuel efficiency. However, the business of trucking is highly competitive and sensitive to operating costs, which include not only fuel costs but also capital costs and costs associated with any tasks that the driver or others must do to operate the truck and performing loading and unloading operations. In this regard, a one piece fairing covering the back of the trailer box will typically also cover the loading/unloading doors. Therefore, such a fairing is cumbersome if permanently mounted to the trailer box. Likewise, dismounting and securing the fairing each time a loading/unloading operation is to be performed takes extra time, may require additional equipment to assist in the movement, stowage and positioning of the relatively large fairing, and may not be within the skills of the driver and/or loaders.

Attempts have also been made to make the rear fairing in some way retractable so that it does not impair off-highway activities. However, these efforts have to date not yielded devices having widespread use. There is therefore still a need for a rear fairing for transportation vehicles, such as trucks and truck trailer boxes, which ably accommodates both aerodynamic and ease of use considerations to provide the user sufficient increased profitability to warrant its use.

SUMMARY OF THE INVENTION

The present invention is a deployable fairing that is made from two principal assemblies that are mirror images of each other. Each assembly comprises a first semi-rigid surface having a curved edge, with the first semi-rigid surface secured to the vehicle in a manner that permits the first semi-rigid surface to assume two positions: a first position adjacent the vehicle, and a second position extended from the vehicle. There is further provided a first joint structure which spans the first semi-rigid surface, to permit the first semi-rigid surface to be folded when in the first position and unfolded when in the second position. As described in more detail below, this first semi-rigid surface advantageously acts as a single panel when fully deployed, while converting to two panels to facilitate retraction and storage.

Each assembly also includes a second semi-rigid surface having a curved edge, with the second semi-rigid surface secured to the vehicle in a manner that permits the second semi-rigid surface to assume a first position adjacent the vehicle and a second position extended from the vehicle. The first and second semi-rigid surfaces are joined together at their first and second curved edges by a second joint structure adapted to permit the first and second semi-rigid surfaces to fold approximately together when the first and second semi-rigid surfaces are adjacent the vehicle.

Utilizing these and other aspects of the invention disclosed herein, the aerodynamic and rigidifying aspects of the fairing design each contribute to enhance the other. The truck operator can readily deploy the fairing prior to highway travel, while at the same time readily stow the fairing against the trailer box prior to approaching a loading dock, opening doors and loading or unloading.

DETAILED DESCRIPTION OF THE INVENTION

Figure 1:
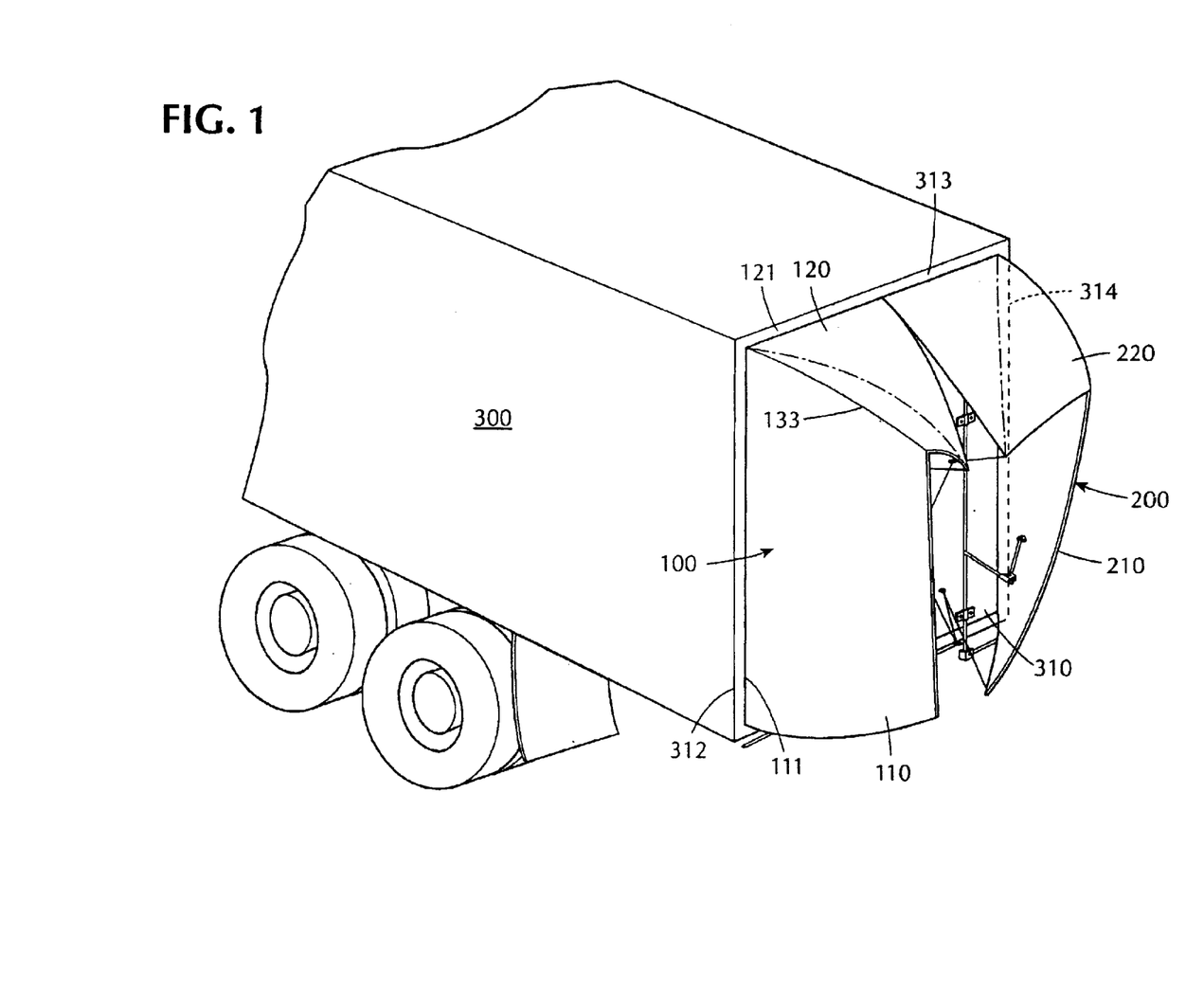
FIG. 1 depicts a schematic perspective view of an exemplary embodiment of the present invention, attached to the rear of a trailer box, with the invention in the fully deployed position.

In the figures, there is shown an exemplary embodiment of this invention, which includes two principal assemblies, a first fairing assembly 100 and a second fairing assembly 200. These assemblies are secured (as explained below) to the rear portion of a vehicle or vehicle element, which as shown in the figures is the rear portion of a truck trailer box 300, although this invention can be utilized to reduce drag in any transport vehicle or means having a relatively blunt rear. The rear of trailer box 300 in FIG. 1 is a vertical surface, and preferably comprises two doors, as is known in the art, which are hinged to rotate in proximity to the axes defined by vertical rear trailer edges 312 and 314. This hinge arrangement permits the doors to open and close by pivoting approximately about edges 312 and 314.

Assemblies 100 and 200 are identical, except that assembly 200 is a mirror image of assembly 100. For convenience, the following description will generally refer to the components of assembly 100 only, it being recognized that the description applies equally well to assembly 200.

Assembly 100 includes two principal components, a vertical fairing surface 110 and a horizontal fairing surface 120. When folded or stowed, surfaces 110 and 120 are generally planar in geometry, although as described below (and as depicted in FIG. 1) they each do assume a curvature when deployed. The vertical fairing surface 110 and horizontal fairing surface 120 are each semi-rigid in construction. In this disclosure, a surface or panel is semi-rigid when it is of such thickness and material properties that, when flat, its bending stiffness and strength are low enough to permit the panel to bend elastically, without permanent deformation, to a radius of the same order of magnitude as the panel's width or height, and yet, when so bent elastically, the panel has sufficient resistance to buckling to enable it to resist load as a shell structure. Since the bending is elastic, the surface will re-assume a planar geometry upon ending the application of the external force used to create the bending. This semi-rigid construction can be achieved by forming each of the vertical fairing surface 110 and horizontal fairing surface 120 from a sheet of material such as sheet polypropylene.

Vertical fairing surface 110 includes a terminal portion 111 that is depicted as a linear edge of surface 110, although it is not essential to this invention that portion 111 be linear. Vertical fairing surface 110 is secured to the rear of trailer box 300 (in this case at terminal portion 111) in a manner which permits surface 110 to rotate approximately about the axis defined by vertical trailer edge 312. The terminal portion 111 of vertical fairing surface 110 is secured to trailer box 300 by any suitable feature or mechanism that will accord it the aforementioned rotational degree of freedom, such as by mechanical hinges. However, it should be understood that any feature or mechanism permitting such a rotational degree of freedom is suitable for use in the present invention, and that such a feature or mechanism need not be necessarily secured to terminal portion 111.

Likewise, horizontal fairing surface 120 includes a terminal portion 121 that is depicted as a linear edge of surface 120, although it is not essential to this invention that portion 121 be linear. Horizontal fairing surface 120 is secured to the rear of trailer box 300 (in this case at terminal portion 121) in a manner which permits surface 120 to rotate approximately about the axis defined by horizontal trailer edge 313. As was the case with vertical fairing surface 110, the terminal portion 121 of horizontal fairing surface 120 is secured to trailer box 300 by any suitable mechanism that will accord it the aforementioned rotational degree of freedom, such as by mechanical hinges. However, it should be understood that any mechanism permitting such a rotational degree of freedom is suitable for use in the present invention, and that such a mechanism need not be secured to terminal portion 121.

Figure 5A:
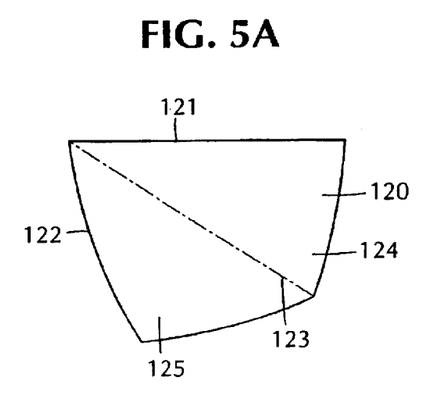
FIGS. 5A and 5B depict plan views of exemplary embodiments of horizontal fairing surface 120 and vertical fairing surface 110 in unassembled form.

Referring to FIG. 5A, horizontal fairing surface 120 has a joint structure 123 spanning horizontal fairing surface 120 from the intersection of terminal portion 121 and curved edge 122 to, in this case, the diagonally opposite corner of horizontal fairing surface 120. The purpose of joint structure 123 is to allow the two parts of horizontal fairing surface 120, specifically horizontal center panel 124 and horizontal side panel 125, to fold together when fairing assembly 100 is stowed against the trailer body. Accordingly, while shown in FIG. 5A to span surface 120 diagonally, orientation of joint structure 123 is preferably in accordance with the orientation that will most easily permit panels 124, 125 of horizontal fairing surface 120 to fold together and against vertical fairing surface 110 in a compact manner without significantly stressing or bending the components, or requiring undue force to hold the folded assembly together. Joint structure 123 allows rotation of panels 124, 125 relative to each other, while also permitting bending of the joint structure 123 as such rotation proceeds. While depicted as linear, joint structure 123 optionally can be curved, as a means for imparting more shape.

Figure 6:
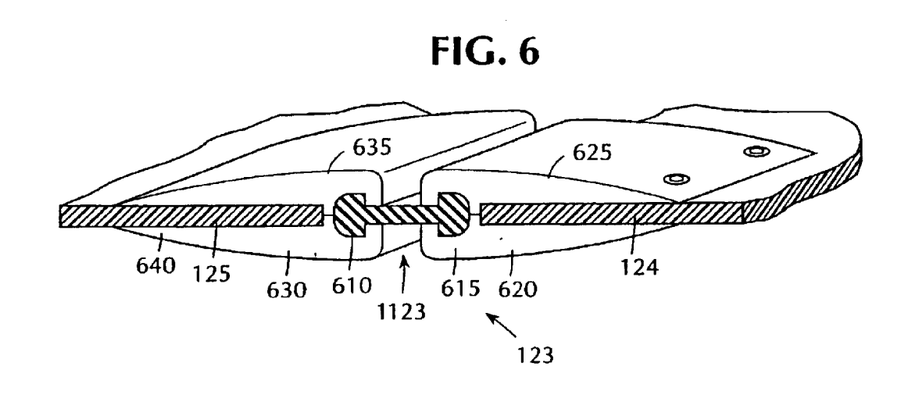
FIG. 6 depicts an exemplary mechanism for the joinder of panel 124 with panel 125.

A joint structure mechanism suitable for joint structure 123 is depicted in FIG. 6. In FIG. 6, one end of an elastomeric member 1123, made for example of rubber, is clamped between parts 620, 625 of securing member 615, and the other end of elastomeric member 1123 is clamped between parts 635, 640 of securing member 630. Securing members 615 and 630, which can be formed of molded polypropylene or other suitable material, are in turn respectively joined to parts 124 and 125 in any suitable manner, such as by rivets, welds, nuts and bolts, or the like. Elastomeric member 1123 or securing members 615 and 630 (or all) can be continuous in length, or interrupted, as is preferred. Alternatively, joint structure 123 can be a series of interrupted hinges spaced along the length of the intersection of panels 124, 125, as well as other mechanisms providing a similar function.

Figure 5B:
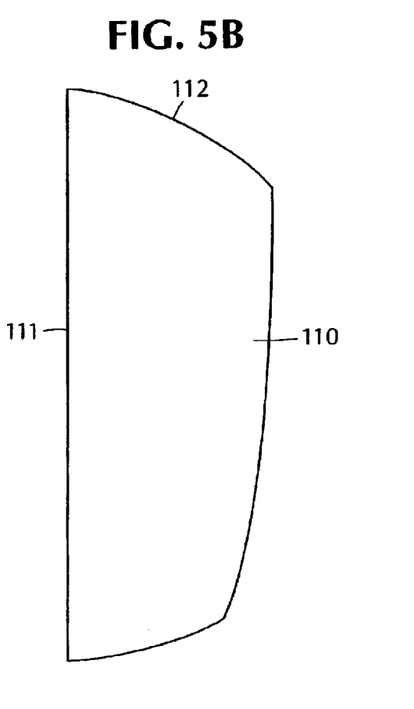

As depicted in FIGS. 5A and 5B, vertical fairing surface 110 has a curved edge 112 and horizontal fairing surface 120 has a curved edge 122. The chord line of curved edge 112 forms less than a right angle with terminal portion 111, and the chord line of curved edge 122 forms less than a right angle with terminal portion 121. When the assembly 100 is assembled, edges 112 and 122 are joined along their lengths by a joint structure 133 (depicted in FIGS. 1 and 2A) that allow rotation of surface 120 relative to surface 110 about the intersection of edges 112, 122, while also permitting bending of the joint structure 133 as such rotation proceeds. The joint structure 133 can be depicted in FIG. 6. Alternatively, joint structure 133 can be a series of interrupted hinges along the length of the intersection of curves 112, 122, as well as other mechanisms providing a similar function.

The deployment of fairing assembly 100 proceeds as follows, starting from the condition where assembly 100 is stowed against the trailer body. More particularly, in that condition, horizontal fairing surface 120 is stowed against the trailer body, and the upper portion of vertical fairing surface 110 is stowed against horizontal fairing surface 120. The two panels 124, 125 are in a folded state, with panel 124 sandwiched between panel 125 and the trailer body, and panel 125 sandwiched between vertical fairing surface 110 and panel 124.

Deployment commences by simply rotating vertical fairing surface 110 out away from the container body, as a result of which horizontal fairing surface 120 also starts to deploy. As this operation proceeds, the internal angle between surface 110 and panel 125 starts to open up, which in turn causes the region of surface 120 proximate to curved edge 122 to be urged into a downwardly curved shape, in seeking to conform to the curvature of curved edge 112. Likewise, the region of vertical surface 110 proximate to curved edge 112 is urged into a curved shape, in seeking to conform to the curvature of curved edge 122.

To complete deployment, a force or torque is applied to horizontal fairing surface 120 in a manner causing horizontal fairing surface 120 to elastically buckle outward along the length of joint structure 123, with the result that panels 124, 125 are made locally co-planar in the region of joint structure 123, while the buckling action causes surface 120 to assume a curved shape. For example, by utilizing appropriate mechanical structures or systems, a force may be applied in the region of the anti-node of the primary buckling mode of horizontal fairing surface 120, in a direction generally normal to the plane of surface 120. The result of surface 120 buckling outward is to "lock" joint structure 123 in the open position, until such time as another force is applied to cause structure 123 to buckle back into its original shape, thus freeing up joint structure 123 to rotate.

Figure 2A:
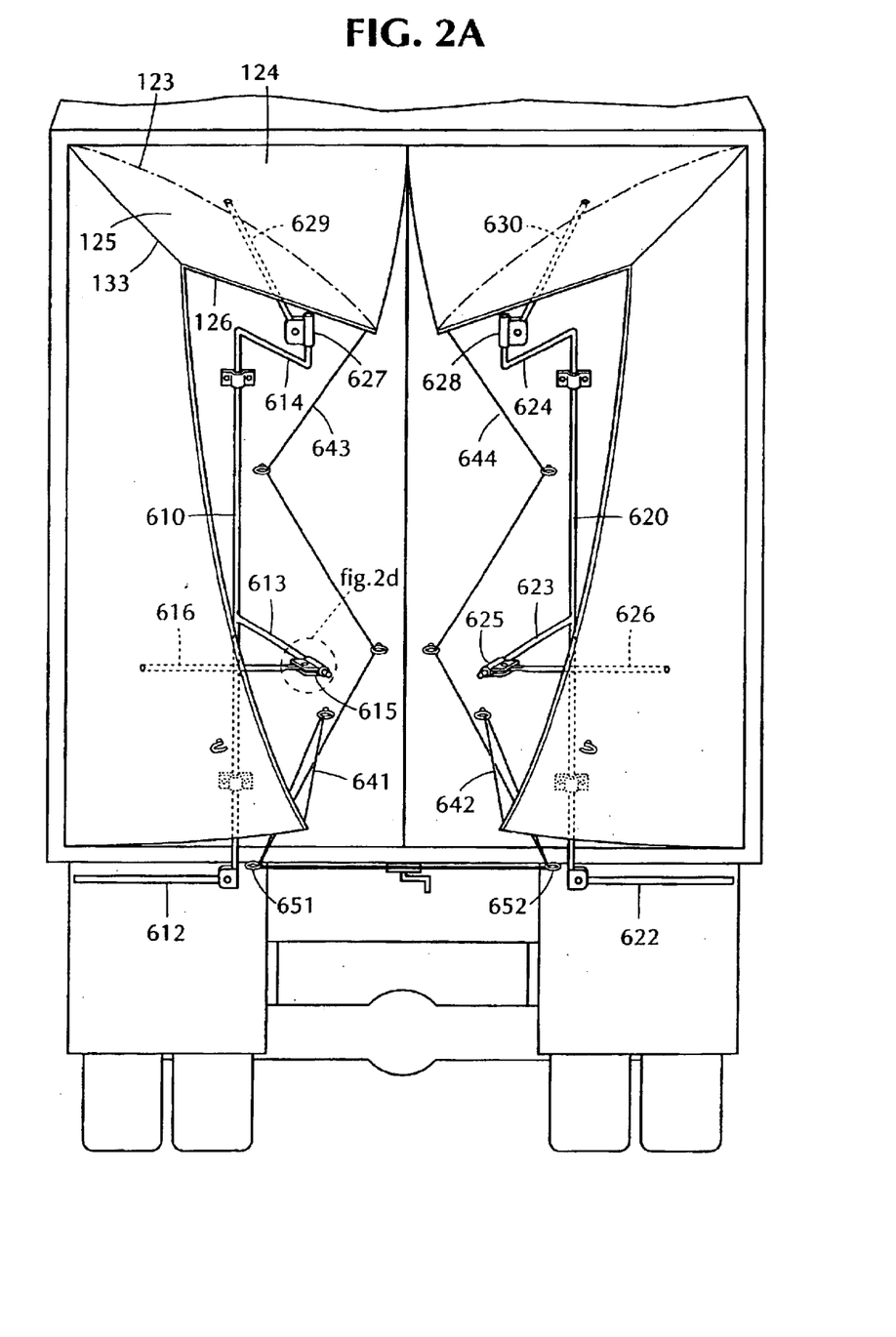
FIG. 2A depicts a rear view of an exemplary embodiment of the present invention, attached to the rear of a trailer box, with the invention in the fully deployed position.
Figure 2B:
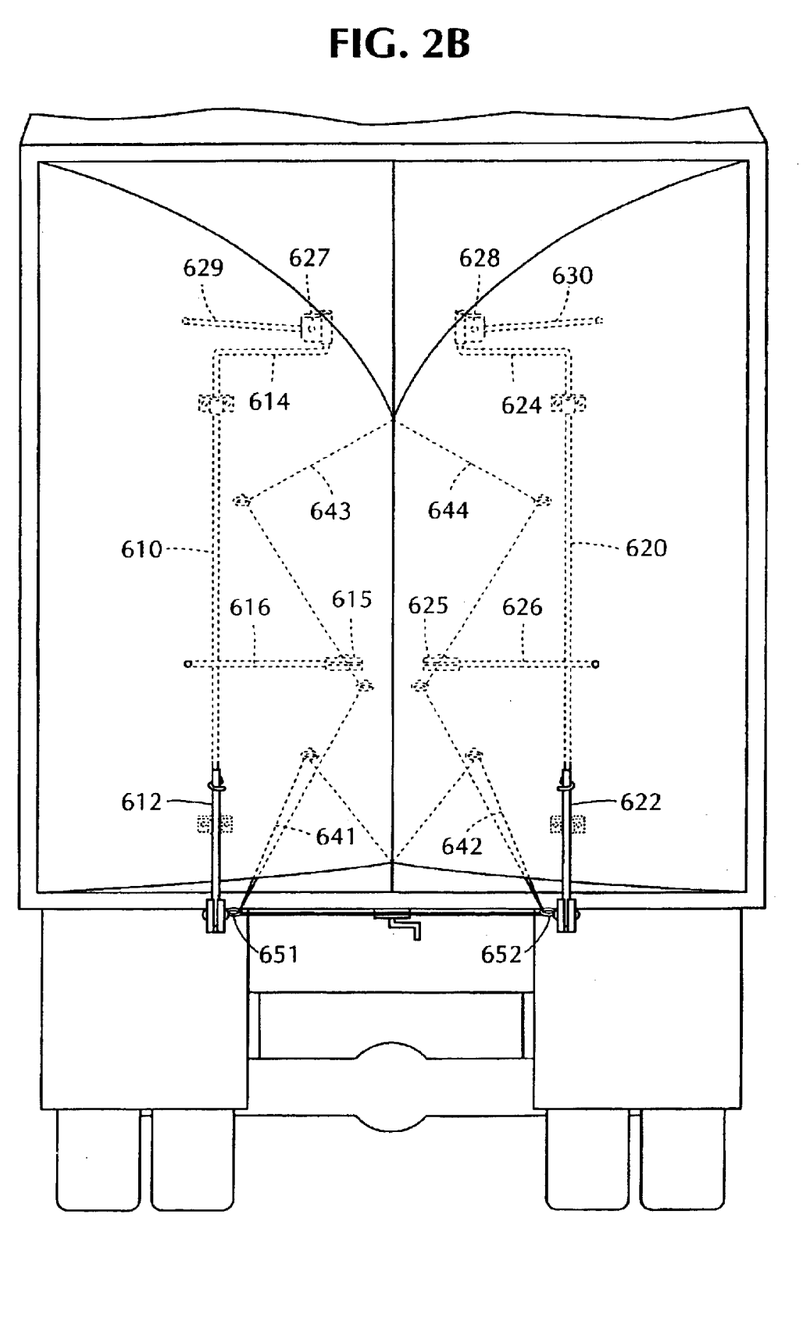
FIG. 2B depicts a rear view of an exemplary embodiment of the present invention, attached to the rear of a trailer box, with the invention in the fully stowed position.
Figure 2C:
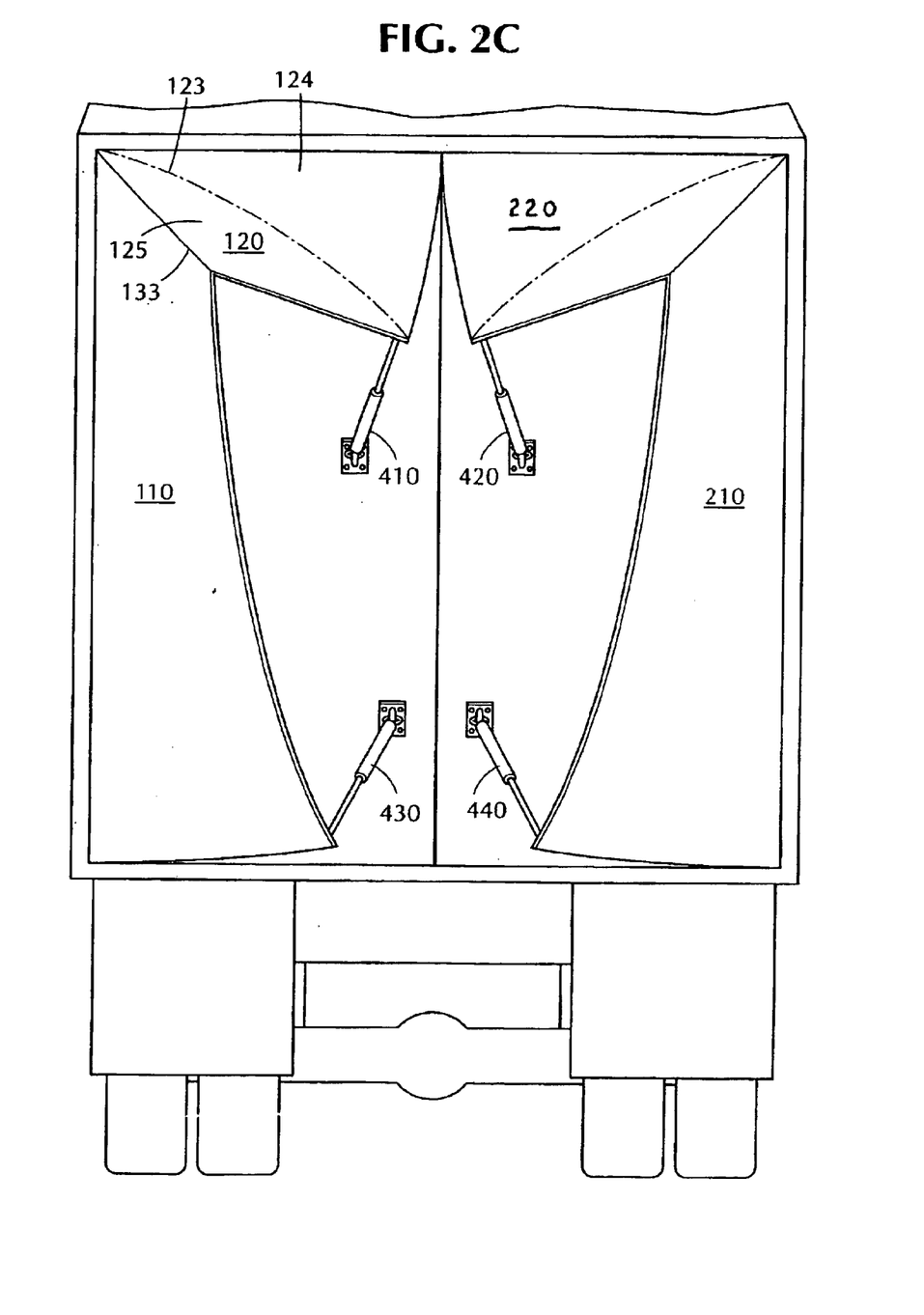
FIG. 2C depicts a rear view of an exemplary embodiment of the present invention, illustrating an embodiment of a tensioning mechanism that can be utilized in this invention.
Figure 2D:
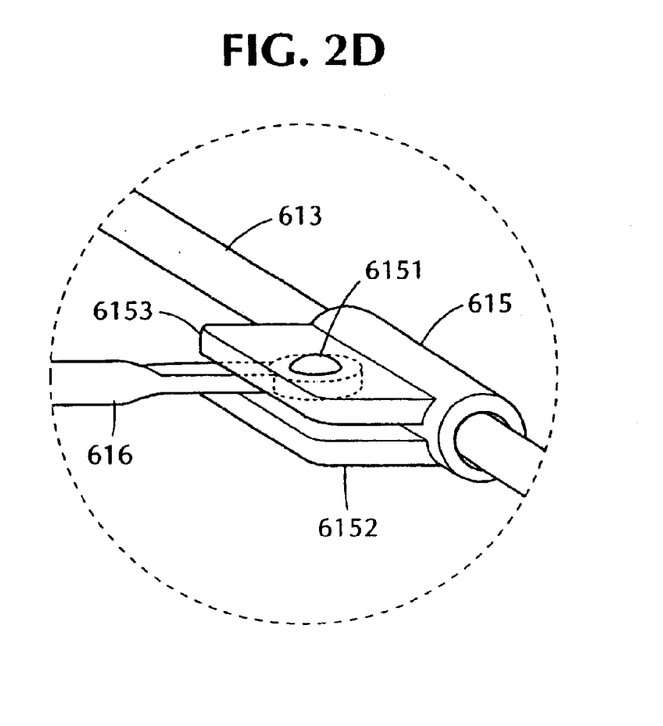
FIG. 2D depicts an exemplary embodiment of the collar 615.
Figure 3A:
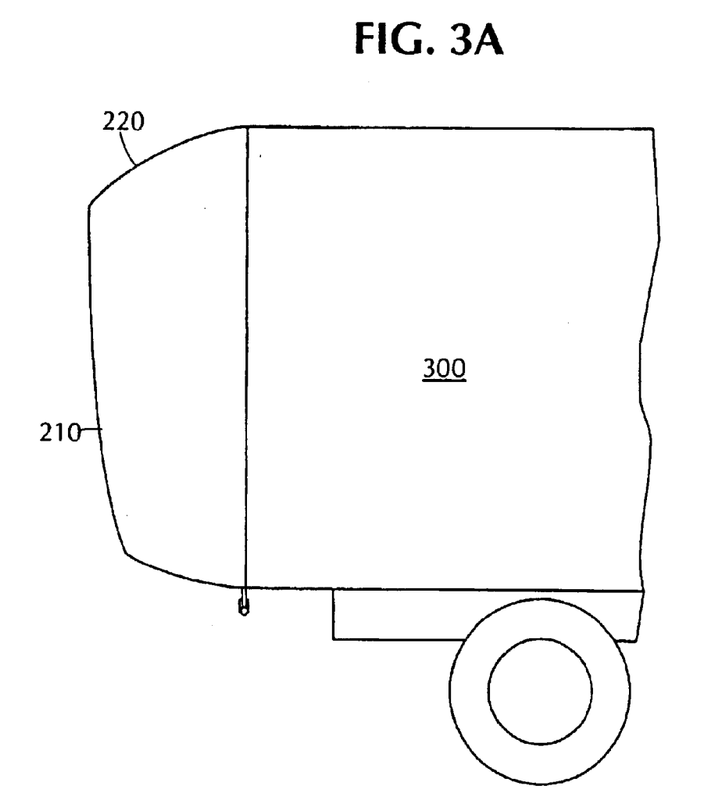
FIG. 3A depicts a side elevational view of an exemplary embodiment of the present invention, attached to the rear of a trailer box, with the invention in the fully deployed position.
Figure 3B:
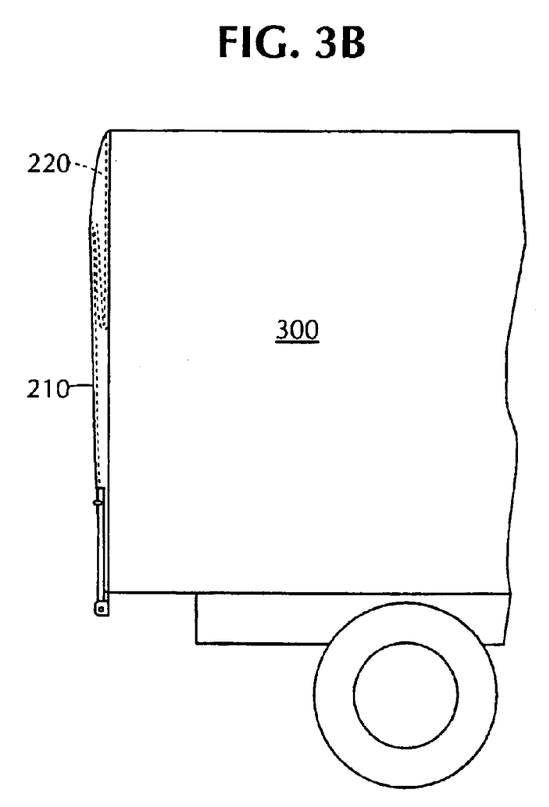
FIG. 3B depicts a side elevational view of an exemplary embodiment of the present invention, attached to the rear of a trailer box, with the invention in the fully stowed position.
Figure 4:
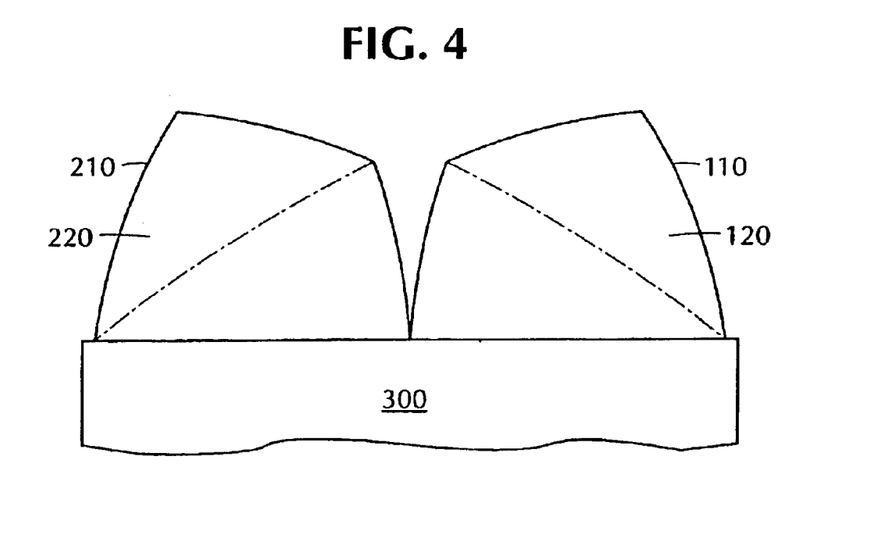
FIG. 4 depicts a top view of an exemplary embodiment of the present invention, attached to the rear of a trailer box, with the invention in the fully deployed position.

Deployment and stowage of the fairing surfaces can be done manually or using deployment/stowage mechanisms. For example, as depicted in FIG. 2A, there is shown a deployment mechanism, comprising two torsion bars 610, 620 that are secured to the doors of the trailer box to permit the bars to be rotated by movement of handles 612, 622. This rotational movement causes levers 613, 614, and 623, 624 to swing outward. Collars 615, 625, which are respectively positioned in a slip-wise manner over levers 613 and 623, are attached via fasteners to lower arms 616, 626. Likewise, collars 627, 628 are respectively positioned in a slip-wise manner over turned up portions of levers 614, 624, and are attached via fasteners to upper arms 629, 630. The lower arm 616 is fastened to vertical fairing 110, as lower arm 626 is fastened to vertical fairing 210. Likewise, upper arm 629 is fastened to horizontal fairing 120, and upper arm 630 is fastened to horizontal fairing 220. The collars 615, 625, and 627, 628 are free to rotate as levers 613, 623, and 614, 624 move. Also, arms 616, 266, and 629, 630 are fastened so as to be able to rotate about the fastener in a spatial plane passing through the center line of the portion of the lever about which the associated collar rotates. FIG. 2D shows collar 615 in further detail, and illustrates that collar 615 can move along the length of lever 613 and rotate about lever 613. Fastener 6151 is a pin that fastens lower arm 616 between two trunions 6152, 6153 that are part of fastener 615, thereby permitting lever 616 to rotate as described above.

The result of the arrangement depicted in FIGS. 2A and 2D is that as handles 612, 622 are swung outward, the arms 616, 626, and 629, 630 are placed in compression, thereby causing deployment of horizontal fairings 120, 220 and vertical fairings 110, 210. Likewise, as handles 612, 622 are swung inward, the arms are placed in tension, thereby causing retraction of horizontal fairings 120, 220 and vertical fairings 110, 210.

The rigidity of fairing assemblies 100, 200 can be enhanced by tensioning inward the free edges of vertical fairing surface 110 and horizontal fairing surface 120 during or subsequent to their deployment. For example, as depicted in FIG. 2C, there is shown a tensioning mechanism, comprising four tensioning components, pneumatic or hydraulic cylinders 410, 420, 430 and 440, respectively attached to the free edges of horizontal fairing surfaces 120, 220, and vertical fairing surfaces 110, 210. In one embodiment, the hydraulic cylinders of the tensioning mechanism are actuated after deployment of the fairing assemblies 100, 200 to pull the free edges of the fairing assemblies inward. This further curves horizontal fairing surfaces 120, 220 and vertical fairing surfaces 110, 210, and gives them a more aerodynamically effective, drag-reducing shape, in addition to further rigidifying the fairing assembles 100, 200.

This desirable tensioning can also be obtained by other tensioning mechanism designs, such as cable arrangements. For example, there is shown in FIG. 2A a set of four cables 641, 642, 643 and 644, which are used to provide the requisite tensioning. These cables 641–644 can be tensioned after deployment of fairing assembles 100, 200.

Alternatively, the tensioning mechanism can be designed to cause tensioning in a passive manner, such that deployment of the fairing surfaces by itself causes the tensioning mechanism to operate and, in turn, bend the fairing surfaces in an appropriate manner. For example, tensioning of cables 641–644 can be accomplished by securing them to rings 651, 652 at an appropriate length. By doing so, the cables 641–644 assume a tensioned state after partial deployment of the fairing surfaces, and further deployment of the fairing surfaces to a fully deployed state causes the fairing surfaces to bend to the appropriate degree. A similar passive tensioning function can be achieved by using other suitable tensioning mechanism designs, such as designs employing rods, levers, etc., as the primary elements, as would be evident to a person of ordinary skill in the art.

Certain tensioning mechanisms can also be used to effect deployment and retraction of the fairing assemblies 100, 200. For example, referring to FIG. 2C, the initial deployment of vertical fairing surfaces 110, 210 and horizontal fairing surfaces 120, 220 can be effected by extending cylinders 430, 440, 410 and 420. Then, after horizontal fairing surfaces 120, 220 are made to assume their final shape, cylinders 430, 440, 410 and 420 can be partially retracted to pull the free ends of the fairing assemblies inward.

A noteworthy feature of the foregoing tensioning mechanism designs is that they can be secured to the typical outward-folding hinged trailer box loading doors, and will not impede use thereof. In the event a roll-up door is preferred, the tensioning mechanism can be secured to a hinged frame that folds against the back of the trailer box during highway operation and against the sides (or one side, depending upon whether the frame is split into two halves) of the trailer box during loading/unloading operations.

While only some of the present embodiments are described above, it is obvious that several modifications are possible without departing from the spirit of the present invention. It is also further understood that various further changes and modifications can be made without departing from the spirit and scope of the invention.

What is claimed is:

1. A vehicle element fairing structure, comprising:
   a first semi-rigid surface having a first edge, a second edge and a third generally non-linear edge joining the first and second edges, the chord line of the third generally non-linear edge forming less than a right angle with the first edge, the first semi-rigid surface for being rotatably secured to a vehicle element at the first edge to permit the first semi-rigid surface to assume a first position adjacent the vehicle element and a second position extended from the vehicle element, and the first semi-rigid surface comprising two joined panels to permit the first semi-rigid surface to be folded when in the first position and unfolded when in the second position;

a second semi-rigid surface having a fourth edge, a fifth edge and a sixth generally non-linear edge joining the fourth and fifth edges, the chord line of the sixth generally non-linear edge forming less than a right angle with the fourth edge, the second semi-rigid surface for being rotatably secured to the vehicle element at the fourth edge to permit the second semi-rigid surface to assume a first position adjacent the vehicle element and a second position extended from the vehicle element; and the first and second semi-rigid surfaces joined together at their third and sixth generally non-linear edges to permit the first and second semi-rigid surfaces to fold approximately together when the first and second semi-rigid surfaces are adjacent the vehicle element.

2. The vehicle element fairing structure as in claim 1, further comprising a tensioning mechanism secured to the first semi-rigid surface and the second semi-rigid surface, for being secured to the vehicle element.

3. A vehicle element fairing structure as in claim 1, further comprising a deployment/stowage mechanism.

* * * * *

UNITED STATES PATENT AND TRADEMARK OFFICE
CERTIFICATE OF CORRECTION

PATENT NO. : 6,799,791 B2
DATED : October 5, 2004
INVENTOR(S) : James Reiman et al.

It is certified that error appears in the above-identified patent and that said Letters Patent is hereby corrected as shown below:

<u>Column 4,</u>
Line 6, please change "comer" to -- corner --.

Signed and Sealed this

Eleventh Day of January, 2005

JON W. DUDAS
*Director of the United States Patent and Trademark Office*